B. C. Boyes

Folding Guide for Sewg. Machines.

4449 REISSUED JUN 27 1871.

Witnesses { J. P. Crawford / Edward C. Osborn } B. C. Boyes Inventor.

Willcox & Gibbs Sewing Machine Co Assignees

C. A. Seymour Atty

AM. PHOTO-LITHOGRAPHIC CO. N.Y. (OSBORNE'S PROCESS.)

UNITED STATES PATENT OFFICE.

WILLCOX & GIBBS SEWING-MACHINE COMPANY, OF NEW YORK, N. Y., ASSIGNEE, BY MESNE ASSIGNMENTS, OF BURRITT C. BOYES, DECEASED.

IMPROVEMENT IN FOLDING-GUIDES FOR SEWING-MACHINES.

Specification forming part of Letters Patent No. 15,402, dated July 22, 1856; extended seven years; reissue No. 4,449, dated June 27, 1871.

*To all whom it may concern:*

Be it known that BURRITT C. BOYES, of the city and county of Philadelphia and State of Pennsylvania, did invent a new and Improved Hemming, Folding, and Cording Apparatus to be attached to and used with Sewing-Machines, of which the following is a specification:

Prior to the date of this invention the surfaces of all instruments for turning hems, fells, or folds in cloth were practically rigid and fixed in their place. They were adjusted at such a distance from each other as would be filled by material of average thickness. The result of this was that if they operated upon material of ordinary even thickness they would not operate practically upon any other. If the material was thinner the hem or fell would not be properly turned; and if it was thicker, or a seam or other varying thickness occurred, it would not pass between the surfaces.

This invention of B. C. BOYES obviated these difficulties, as it will readily receive and operate practically upon material of different or unequal thicknesses. It consists in constructing guides for turning hems, fells, and plaits with elastic surfaces, which will readily adapt themselves to different or varying thicknesses of material, and control, govern, and present the material properly to the action of the sewing-machine.

Figure 1:
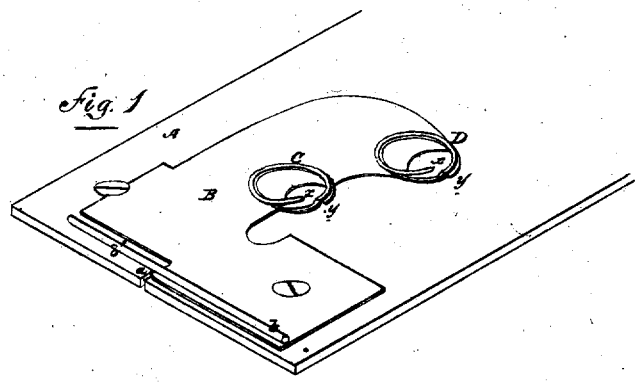
Figure 2:
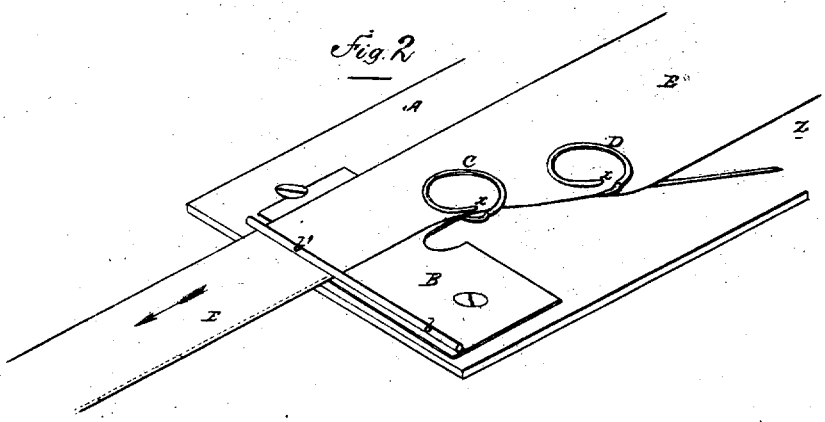

Figure 1 is a perspective view of the folding, hemming, and cording apparatus of the ordinary size. Fig. 2 is the same as Fig. 1, with the cloth introduced to show the action of the folding surfaces.

A represents a metal plate, such as is generally attached to sewing-machines to receive and support the material to be operated upon, and *a* is an orifice in the said plate through which the needle operates in the usual manner. To the plate A is secured, by a screw or other suitable means, a metal plate, B, as shown in Fig. 1, and to this plate are attached helical rings C and D, technically called slit-rings. On the same plate B is attached the guard *b b'*, so arranged that the portion *b'* of said guard shall be a sufficient distance from the plate A to allow the folded fabric to pass easily, and also a sufficient distance from the orifice *a* to allow the needle to operate freely.

When it is desired to make a hem of a single fold upon the edge of the material one ring only is used—that one nearest the needle; the edge of the material being introduced between the elastic surfaces is drawn or fed along in the direction of the arrow, Fig. 2. The part *y* of the surface turns over a single fold, while the other part *x* guides the said fold, which passes along under the end *b'* of the guard, and is acted upon by the sewing mechanism.

In order to turn a double fold, as a regular hem or fell upon the material, both helical rings are used, as shown in the drawing, one ring being a short distance in advance of the other, and as the material is drawn or fed forward through the folding surfaces a double fold, as a full hem or fell, will be folded and presented to the action of the sewing mechanism, as will be readily understood by referring to the drawing, Fig. 2.

It will be readily understood and perceived that plaits or folds can be formed in the middle as well as on the edge of the material by the employment of similar folding surfaces, the extent of such folds or plaits being determined by the size and arrangement of the folding blades or surfaces.

When it is desired to introduce a cord into the hem the cord is placed between the folding surfaces previous to the introduction of the edge of the material, so that, as it is folded over, the cord will be within the hem, as shown in dotted lines in Fig. 2.

It is not intended to claim in general terms every device for automatically turning a hem or fell and presenting it to the needle of a sewing-machine, for several devices for such purposes were known and used before said BOYES'S invention; but they were constructed with unyielding parts which did not readily admit of the passage of material of different or varying thicknesses. We are aware that in the patent No. 12,826 there is a spring which, it is said, yields to varying thicknesses of goods; but in such case the spring presses the upper turn of the cloth against a perfectly rigid surface, under which the material passes; and as only that portion of the cloth which is turned over on itself is touched by the spring, such device is impracticable as a hemmer. In the BOYES invention, however, the part of the device which lies between the turned fabric is adapted to yield to materials of varying or different thicknesses passing between it and the support for the main portion of the cloth, and that part lying between the fold of the cloth when the hem is formed in the BOYES invention forms part of the yielding surface.

What is claimed as the invention of BURRITT C. BOYES is—

A hemming-guide arranged to automatically turn the hem, and having an elastic or yielding surface adapted to operate on material of different or varying thicknesses, substantially as described and specified.

JAS. WILLCOX,
*Prest. Willcox & Gibbs Sewing Machine Co.*

Witnesses:
C. A. DURGIN,
EDWARD E. OSBORN.